United States Patent [19]
Fukushi et al.

[11] Patent Number: 4,492,889
[45] Date of Patent: Jan. 8, 1985

[54] STATOR OF SUBMERGED MOTOR

[75] Inventors: Keiji Fukushi; Yutaka Higashimura, both of Hitachi; Shinei Huzioka, Ibaraki; Syuzou Iwaasa, Hitachi; Kenzo Kadotani, Hitachi, all of Japan

[73] Assignee: Hitachi, Ltd., Tokyo, Japan

[21] Appl. No.: 552,763

[22] Filed: Nov. 17, 1983

[30] Foreign Application Priority Data

Nov. 19, 1982 [JP] Japan .................. 57-202114

[51] Int. Cl.$^3$ .............................................. H02K 5/10
[52] U.S. Cl. ........................................ 310/87; 310/43;
 310/86; 310/89; 310/254; 29/596
[58] Field of Search ................. 310/85, 86, 87, 88,
 310/89, 91, 40 MM, 43, 45, 105, 254, 258;
 29/596; 264/272.2

[56] References Cited

U.S. PATENT DOCUMENTS

| 2,944,297 | 7/1960 | Maynard | 310/87 |
| 3,382,383 | 5/1968 | Turk | 310/86 |
| 3,742,595 | 7/1973 | Lykes | 310/89 |
| 3,777,194 | 12/1973 | Scheafer | 310/87 |

FOREIGN PATENT DOCUMENTS 0966156 8/1964 United Kingdom .................. 310/43

Primary Examiner—R. Skudy
Attorney, Agent, or Firm—Antonelli, Terry & Wands

[57] ABSTRACT

A stator of a submerged motor is provided with cylinders formed of carbon fiber reinforced plastics of super-high precision. To obtain flawless joints between the cylinders of carbon fiber reinforced plastics and the end covers increased wall thickness portions are provided at opposite axial end portions of an inner cylinder near joints of the inner cylinder with the end covers, one increased wall thickness portion being located at one axial end portion on an outer side surface thereof and the other increased wall thickness portion being located at the other axial end portion on an inner side surface thereof. Thus, the inner cylinder has a small wall thickness at an axial central portion to reduce an eddy current loss while its wall thickness is increased at the opposite axial end portions to improve mechanical strength and facilitate joining of the end covers to the inner cylinder.

8 Claims, 6 Drawing Figures

STATOR OF SUBMERGED MOTOR

BACKGROUND OF THE INVENTION

This invention relates to stators of submerged motors and methods of producing same, and, more particularly, to a stator of a submerged and a method of producing same which motor may be used with a water circulating pump or other motor which is capable of operation in the water with high reliability.

Generally, a submerged motor is an induction electric motor in which a rotor substantially producing no voltage is placed in such a manner that its coil conductors are in direct contact with the water. However, a stator coil having a high voltage applied thereto should have a watertight construction because an insulation layer of the coil would have its dielectric strength greatly reduced if it were brought into direct contact with the water. Thus, in motors of medium and small sizes of an output power of below 50 KW, it has been usual practice to adopt what is generally referred to as a canned system in which the stator is contained in its entirety in a container of stainless steel by filling the gap with a mold resin incorporating inorganic material therein.

As the submerged motors grow in size and output power, it is necessary to increase the wall thickness of a can of stainless steel to meet the requirement of increasing mechanical strength set by an attendant increase in the inner diameter and length of the stator.

On an inner side of the container or can, an eddy current loss would be produced by a revolving magnetic field generated in a gap between the stator and the rotor. The eddy current loss would be proportional to the thickness of the can and the length of a stator core, and would be proportional to the third power of the inner diameter of the can. Of course, it would be proportional to the electric conductivity of the can. Thus, in submerged motors of large size, the thickness of the can and the length of the stator core would become great, resulting in the eddy current loss reaching several percent of the output power. Consequently, such motor could not be accepted for practical use.

A very effective method of obviating the aforesaid problem would consist in using a can of a composite structure provided by using, as material for the inner side of the stator in which an eddy current loss is produced, a material which is high in water shielding effect and low in eddy current loss (or a material of low electric conductivity). A carbon fiber reinforced plastic (hereinafter CFRP for short) would be one example of such materials which meet the requirement. Since a CFRP has an electric conductivity which is about 1/100 that of stainless steel, it would be possible to reduce the value of an eddy current loss to a level below 1% that of stainless steel if a sheet of a CFRP of a thickness of 1–1.5 mm were used by taking mechanical strength into consideration. Such low eddy current loss would pose no problem in putting the canned submerged motor into practical use.

A stator of a submerged motor of the composite can system of a composite structure using an inner cylinder of CFRP generally comprises a stator core usually mounted in the form of a lamination inside an outer cylinder, and a stator coil contained in a slot formed in the stator core. The inner cylinder of CFRP is fitted to the inner side of the stator core, and end covers are attached to opposite ends thereof through inside joints while being joined to the outer cylinder through outside joints to provide a can. The outer cylinder and the end covers are usually formed of stainless steel of higher electric resistance than other metals. An adhesive agent of the epoxy resin base is used for the inside joints for joining CFRP and stainless steel together by taking watertightness into consideration. The outside joints may be provided by welding. By filling the gap in the can with a mold resin by pouring same through an inlet port formed in one of the end covers or the outer cylinder and allowing the poured mold resin to set, it is possible to obtain a stator as a finished article.

The stator of the submerged motor of the aforesaid construction raises, in putting same to production, a problem which is difficult to solve, on account of the thickness of the inner cylinder of CFRP being very small (1–1.5 mm). More specifically, to obtain a stator of a submerged motor of high quality, it is necessary that the cylinder of CFRP be very high in dimensional accuracy and precision (length, inner and outer diameters, circularity, etc.). However, this requirement is hard to satisfy in articles of small wall thickness.

Generally, in producing a cylinder of CFRP, carbon fibers are wound on a mandrel of metal and impregnated with a resin which is allowed to harden, and then the mandrel is withdrawn from a cylindrical object formed thereon. When the cylindrical object is small in thickness, irregularities might be caused to occur in the carbon fibers constituting the cylindrical object or strain might be applied to the hardened resin as the mandrel is withdrawn. Also, withdrawing of the mandrel might cause a deformation to occur in the cylindrical object by mechanical force used for withdrawing. In actual practice, the cylinder of CFRP of a submerged motor of large size has a diameter in the range between 400 and 500 mm. In particles of this large size, it is almost impossible to reduce the deformation to a level below 1 mm. If deformation occurred, the area of adhesion between the end covers and the cylinder of CFRP would be reduced, and moreover a satisfactory bond could not be obtained between them because of gaps existing between them. To improve the bond strength of the inside joints, it is necessary that the angle of connection between each end cover and the inner cylinder be reduced to increase the area of adhesion between them. In the case of articles of small thickness, if the angle of connection were reduced, a reduction in thickness caused by the reduction in the angle of connection might result in breaking or stripping of the end portions when machining is performed, thereby aggravating the deformation described hereinabove. Thus, in stators of submerged motors of the composite can type of the prior art described hereinabove, a problem has been raised with regard to obtaining good joints between the end covers and the inner cylinder of the can.

SUMMARY OF THE INVENTION

This invention has been developed for the purpose of obviating the aforesaid problem of the prior art. Accordingly, the invention has as one of its objects the provision of a stator of a submerged motor wherein the inner cylinder is of a thickness small enough to reduce an eddy current loss to a negligible value and yet satisfactorily good joints can be provided between the inner cylinder and the end covers.

The outstanding characteristic of the invention which enables the aforesaid object to be accomplished is that the inner cylinder has its wall thickness varied at axial opposite end portions thereof in such a manner that one end portion near a joint with one end cover has an increased thickness on the outer side surface and the other end portion near a joint with the other end cover has an increased thickness on the inner side surface.

Another object of the invention is to provide a method of production of a stator of a submerged motor which enables a stator core to be fitted in an outer cylinder and allows a rotor to be inserted into the stator with ease.

The disadvantage of the prior art referred to hereinabove can be avoided by providing the inner cylinder with the increased thickness portions at axial opposite end portions as described hereinabove. However, this structural arrangement has raised the problem that the provision of an increased thickness portion on the outer side surface of the wall makes it impossible to fit the stator core in the outer cylinder and the provision of an increased thickness portion on the inner side surface of the wall makes it impossible to insert the rotor into the stator. To solve this problem, the invention provides a method of production comprising the steps of supporting a stator core with an ending at the outside by an outer cylinder and supporting the stator core at the inside by an inner cylinder in a predetermined position, the inner cylinder being formed with increased wall thickness portions at axial end portions thereof, one at one end portion on an outer side surface thereof and the other at the other end portion on an inner side surface thereof, the inner cylinder having one end cover joined thereto at the one end portion having the increased wall thickness portion on the outer side surface and moved with the other end portion having the increased wall thickness portion on the inner side surface serving as a leading end portion until the predetermined position is reached; joining another end cover to the other end portion of the inner cylinder having the increased wall thickness portion on the inner side surface thereof; joining the end covers at one end thereof to the outer cylinder to provide a watertight container; and filling a resin in a vacant space within the watertight container and allowing same to harden.

DESCRIPTION OF THE PREFERRED EMBODIMENTS

Preferred embodiments of the invention will now be described by referring to the accompanying drawings.

Figure 1:
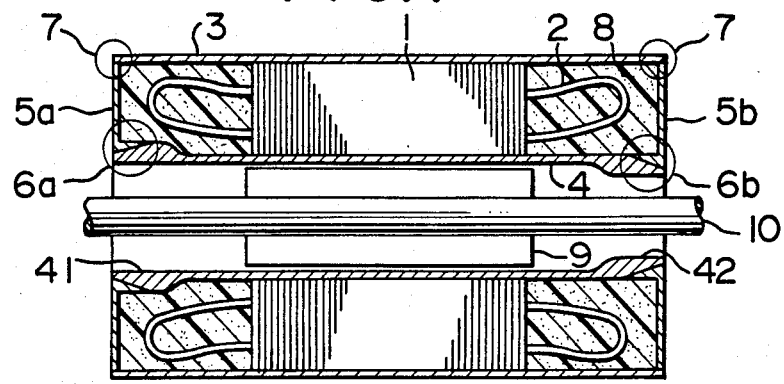
FIG. 1 is a sectional view of the stator of the submerged motor comprising one embodiment of the invention.

As shown in FIG. 1, the stator comprises a stator core 1, a stator coil 2 inserted into a slot, not shown, formed in the stator core 1, and an outer cylinder 3 containing the stator core 1 arranged in lamination. An inner cylinder 4 formed of a CFRP is fitted inside the stator core 1, and end covers 5a and 5b are joined to opposite ends of the outer and inner cylinders 3 and 4 at outside joints 7, to thereby provide a can. The construction described hereinabove is no different from a stator of a submerged motor of the prior art. In the stator according to one embodiment of the invention, the inner cylinder 4 is formed at one axial end portion with an external reinforcing layer 41 and at the other axial end portion with an internal reinforcing layer 42 so that the wall of the inner cylinder 4 has a greater thickness at the opposite end portions than at a central portion thereof. The inner cylinder 4 of such construction may be readily formed of a CFRP by using a stepped mandrel having a depression corresponding to the internal reinforcing layer 42. Thus, in the inner cylinder 4 of CFRP according to the invention, the wall has a thickness of over 6 mm at opposite end portions although its thickness in the central portion is in the range between 1 and 1.5 mm as described hereinabove. By virtue of this feature, the aforesaid defects of the prior art, such as deformation of the inner cylinder and breaking and stripping of its end portions, can be eliminated which might otherwise occur when the inner cylinder is produced and subjected to machining, and the inner cylinder obtained has a high dimensional accuracy and precision. Flawless joints can be provided between such inner cylinder and the end covers.

In accordance with the method of the present invention, first, the end cover 5a is bonded with an epoxy resin to the tapering external reinforcing layer 41 at an inside joint 6a, and the inner cylinder 4 is inserted, from the left in FIG. 1, into the stator core 1 provided with the stator coil 2 and fitted in the outer cylinder 3. When this operation is performed, the internal reinforcing layer 42 at the other axial end portion of the inner cylinder 4 does not interfere with the operation because it is located on the inner side surface of the wall. Then, another end cover 5b is joined to the internal reinforcing layer 42 at an inside joint 6b, and the two end covers 5a and 5b are finally welded to the outer cylinder 3 at the outside joints 7, to provide a can of composite structure. A mold resin 8 incorporating inorganic material powder therein is filled in a space within the can as is the case with the can of the prior art. In this construction, a rotor 9 can be readily assembled with the stator by inserting same from the left into the inner cylinder 4. Thus, the provision of the reinforcing layer 41 and 42 at the opposite axial ends of the wall of the inner cylinder 4 does not interfere with assembling of the rotor with the stator. An additional advantage offered by the provision of the reinforcing layers 41 and 42 is that the area of adhesion can be increased over and above that of the prior art. For example, when the reinforcing layers have a thickness of 6 mm, the area of adhesion is quadrupled with respect to the inner cylinder of the prior art (which has a thickness of 1.5 mm), so that stresses produced in the joints can be reduced to ¼ those of the joints of the prior art, which is conducive to increased reliablity of the motor.

Figure 2:
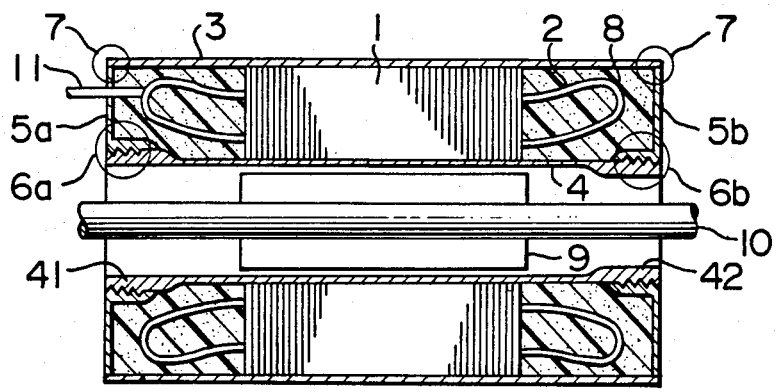
FIGS. 2, 3, 4 and 5 are sectional views of the stators of the submerged motors comprising other embodiments.

As shown in FIG. 2, the external and internal reinforcing layers 41 and 42, provided to the wall of the inner cylinder 4, are threaded on outer peripheral surfaces thereof, and the end covers 5a and 5b are threaded on inner peripheral surfaces thereof, so that the end covers 5a and 5b can be joined to the inner cylinder 4 both adhesively and by threadable engagement. The embodiment of FIG. 2 can achieve the same effects as the embodiment shown in FIG. 1. When the end covers 5a and 5b are threadably attached to the inner cylinder 4 of CFRP, better joints can be provided than when joints are adhesively provided. The strength of the joints of the embodiment shown in FIG. 2 is over five times as high as that of the joints of the embodiment shown in FIG. 1. Leads 11 may be drawn, when necessary, from the stator coil 2 through the end cover 5a which is initially joined to the inner cylinder 4.

Figure 3:
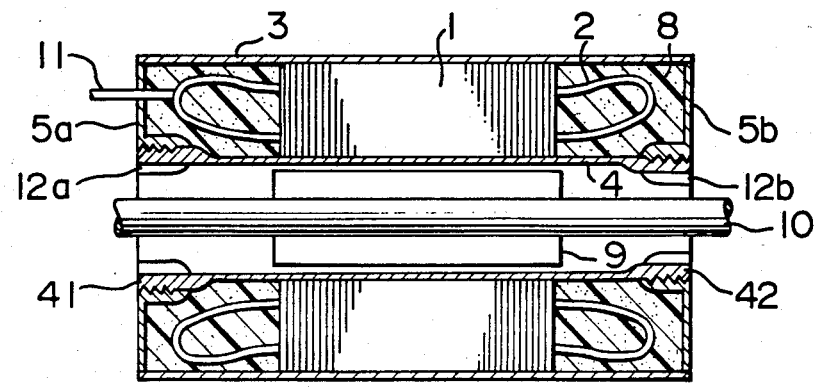

The embodiment of FIG. 3 includes metal rings 12a and 12b of a material having a coefficient of linear expansion higher than or equal to that of the material of the end covers 5a l and 5b intimately fitted to the outer and inner reinforcing layers 41 and 42, respectively, at their inner peripheral surfaces. In the embodiments shown in FIGS. 1 and 2, the CFRP used for forming the inner cylinder 4 has a lower coefficient of linear expansion ($a \approx 0$) than the stainless steel (coefficient of linear expansion, $a \approx 16 \times 10^{-6}$) used for forming the end covers 5a and 5b, so that, when there is a temperature rise, stresses might be produced and act to cause stripping of the joints. Thus, there is the risk that the end covers might be separated from the inner cylinder after prolonged use (because the end covers 5a and 5b expand outwardly and the inner cylinder 4 of CFRP does not expand). However, if the metal rings 12 and 12b formed, of, for example, stainless steel, are fitted to the inner peripheral surfaces of the outer and inner reinforcing layers 41 and 42, respectively, in intimate contact, then the risk that the end covers might be separated from the inner cylinder can be avoided. More specifically, a rise in temperature would cause the metal rings 12 and 12b of stainless steel to expand. Since the modulus of elasticity of stainless steel is about four times as high as that of CFRP, the wall of the inner cylinder 4 formed of CFRP would be stretched to the outer peripheral side as the CFRP expands if the wall of the inner cylinder 4 had a thickness equal to or greater than that of the reinforcing layers 41 and 42, with a result that the wall of the inner cylinder 4 would be brought into still more intimate contact with the end covers 5a and 5b. Also, if a material of a higher coefficient of linear expansion than the material for forming the end covers 5a and 5b is used for forming the metal rings 12a and 12b (iron of $a \approx 11 \times 10^{-6}$ for the end covers 5a and 5b and stainless steel for the metal rings 12 and 12b, for example), then it is possible to increase the bond strength because a rise in temperature brings a pressure to bear upon the joints. The metal rings 12a and 12b may be fitted to the reinforcing layers 41 and 42 either adhesively or by a threadable connection. However, the use of the metal rings 12a and 12b could achieve better results if they were fitted by expansion fit (the metal rings are cooled as by liquid nitrogen and fitted in contracted condition, for example). However, in the embodiment shown in FIG. 3, it is necessary for the metal rings 12a and 12b to be fitted after the rotor 9 is assembled with the stator.

Figure 4:
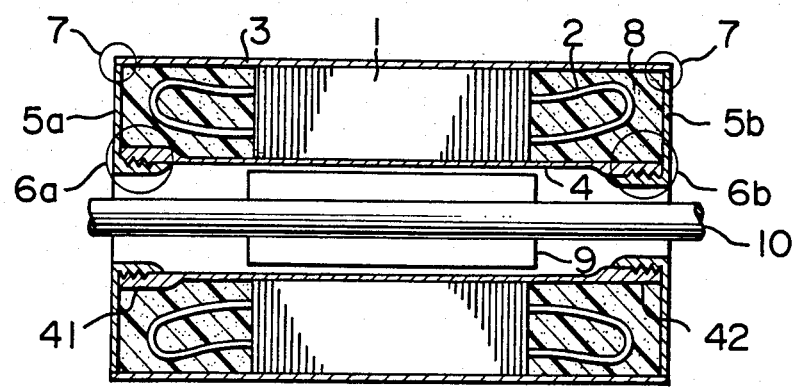

In FIG. 4, the inner peripheral surface of the external and internal reinforcing layers 41 and 42 are threaded and outer peripheral surfaces of flanges of the end covers 5a and 5b in contact with the wall of the inner cylinder 4 are also threaded. The end covers 5a and 5b are threadably connected to the external and internal reinforcing layers 41 and 42, respectively, while an adhesive layer is interposed therebetween. Thus, the flanges of the end covers 5a and 5b are located on the inner peripheral surface of the inner cylinder 4 as contrasted with the embodiment shown in FIG. 2 in which they are located on the outer peripheral surface of the inner cylinder 4. The embodiment of FIG. 4 can achieve the same effects as the embodiment shown in FIG. 2. More particularly, in the embodiment shown in FIG. 4, compressive stresses would be produced at the joints when the temperature rises and no stresses oriented in the direction in which stripping of the end covers off the inner cylinder would occur would be produced, thereby eliminating the need to provide the metal rings 12a and 12b.

Figure 5:
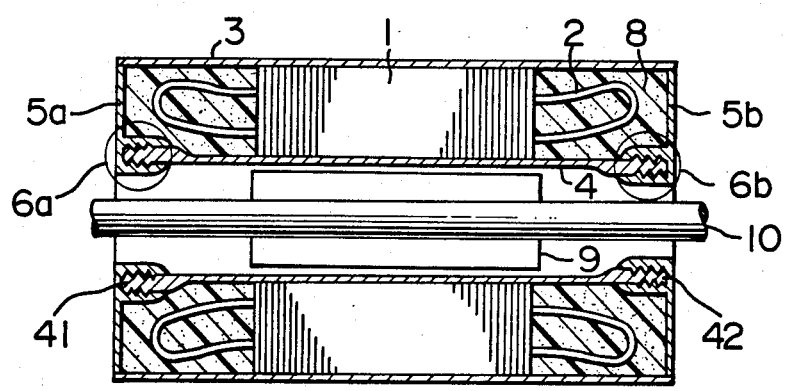

In FIG. 5, in addition to the structural features of FIG. 4, the outer peripheral surfaces of the external and internal reinforcing layers 41 and 42 are also threaded and the end covers 5a and 5b are each formed with an additional flange extending along the outer peripheral surface of reinforcing layers 41, 42 and formed with a threaded portion on an inner peripheral surface thereof. The additional flanges of the end cover 5a and 5b are threadably connected to the external and internal reinforcing layers 41 and 42 at their outer peripheral surfaces with an adhesive layer being interposed therebetween. The embodiment of FIG. 5 can achieve the same effects as the other embodiments described hereinabove. Moreover, the embodiment in FIG. 5 offers the additional advantage that higher reliability in performance can be obtained because the area of adhesion is increased and the distance of water permeation can be increased along the interface of adhesion. In the embodiments shown in FIGS. 4 and 5, it is necessary that the operation of attaching the end cover 5a to the external reinforcing layer 41 of the inner cylinder 4 be performed after the rotor 9 has been inserted into the stator.

Figure 6:
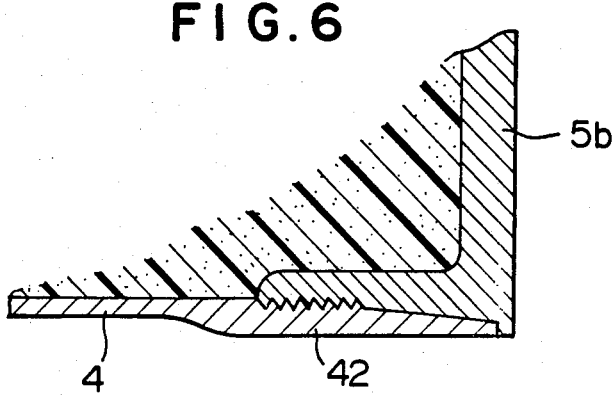
FIG. 6 is a sectional view of still another embodiment of the invention, showing in detail the joint between the inner cylinder and the end cover.

In FIG. 6, the outer peripheral surface of the internal reinforced layer 42 of the wall of the inner cylinder 4 is not threaded along its entire length but only a portion of the outer peripheral surface located remote from its axial end is threaded and the rest of the outer peripheral surface is divergingly tapering in going toward its end, and the flange of the end cover 5b is threaded only on the inner peripheral surface of its forward end portion while the rest of the flange is convergingly tapering in going toward its base. Thus, in attaching the end cover 5b to the inner cylinder 4, the end cover 5b and the internal reinforcing layer 42 of the wall of the inner cylinder 4 are threadably connected at their threaded surfaces, with an adhesive layer being interposed therebetween and adhesively joined together at their tapering surfaces. Although not shown, the end cover 5a and the external reinforcing layer 41 are of the same construction as the end cover 5b and the internal reinforcing layer 42 described hereinabove.

The embodiment shown in FIG. 6 can achieve the same effects as the embodiments described hereinabove. However, the embodiment of FIG. 6 offers the additional advantage that at the a watertightness of the joints is ensured by adhesive bonding and the strength is maintained by the threadable connection. Thus, the combined use of adhesive bonding and threadable connection is more advantageous than the use of threadable connection alone.

In all the embodiments described hereinabove, the inner cylinder 4 has been described as being formed of carbon fiber reinforced plastic which is considered to serve the purpose satisfactorily. It should be noted, however, that the invention is not limited to this specific material for producing the inner cylinder 4, and that any suitable material, such as plastics reinforced with glass fibers or metal fibers (such as stainless steel fibers), may be used for producing the inner cylinder 4 without departing from the scope of the invention. Also, the invention covers applications in which any suitable material, such as an epoxy resin added with inorganic powder material, ceramics, etc., may be used for adhesively joining the end covers to the inner cylinder, and in which the inner cylinder is formed by using thin sheet metal, such as stainless steel foil, and reinforcing layers are provided to its axial end portions.

From the foregoing description, it will be appreciated that the stator of the submerged motor according to the invention is characterized in that an inner cylinder thereof has its wall thickness varied at axial end portions thereof in such a manner that one end portion near a joint with one end cover has an increased thickness on the outer side surface and the other end portion near a joint with the other end cover has an increased thickness on the inner side surface. The stator of the submerged motor of the invention is produced by a method in which a stator core provided with a winding is supported at the outside by an outer cylinder, and an inner cylinder including an increased wall thickness portion on the outer side surface of one axial end portion and an increased wall thickness portion on the inner side surface of the other axial end portion and having one end cover joined to the one axial end portion of increased wall thickness on the outer side surface is moved axially from the other axial end portion of increased wall thickness on the inner side surface to a predetermined position where the inner cylinder supports the stator core at the inside; another end cover is joined to the other axial end portion of increased wall thickness on the inner side surface of the inner cylinder and the end covers are each joined at one end to the outer cylinder to provide a watertight container; and a resin is filled in a vacant space within the watertight container and allowed to harden. In the stator of the submerged motor according to the invention produced by the production method according to the invention, an axial central portion of the wall of the inner cylinder is smaller in thickness than in the axial opposite end portions, so that an eddy current loss can be reduced, and the axial opposite end portions of the wall of the inner cylinder which are greater in thickness than the axial central portion have increased mechanical strength to enable joining to the end covers to be readily affected. In assembling, fitting the stator core in the outer cylinder and inserting a rotor into the stator can be readily effected because the increased wall thickness portions of the inner cylinder at opposite axial end portions thereof are located on the outer side surface at one end portion and on the inner side surface at the other end portion. These features are advantageous when incorporated in a stator of a submerged motor of the type described.

What is claimed is:

1. A stator of a submerged motor comprising:
   a stator core having a winding applied thereto;
   an outer cylinder supporting said stator core at the outside;
   an inner cylinder supporting said stator core at the inside; and
   end covers joining said outer and inner cylinders together at end portions thereof to provide a watertight container composed of said outer and inner cylinders and said end covers and having a hardened resin filled in a vacant space between the inner and outer cylinders and the end covers;
   wherein the improvement comprises:
   increased wall thickness portions formed at said inner cylinder at axial opposite end portions thereof in the vicinity of joints of the inner cylinder with the end covers, one of said increased wall thickness portions being formed on an outer side surface of one axial end portion and the other increased wall thickness portion being formed on an inner side surface of the other axial end portion.

2. A stator of a submerged motor as claimed in claim 1, wherein said increased wall thickness portions comprise reinforcing layers formed on the outer side surface at one axial end portion and on the inner side surface at the other axial end portion.

3. A stator of a submerged motor as claimed in claim 2, wherein said reinforcing layers are each formed with a screw thread on an outer peripheral surface and said end covers are each formed with a screw thread on an inner peripheral surface of an inner end portion on the side of the inner cylinder, and the reinforcing layers and the end covers are threadably joined to each other with an adhesive layer being interposed therebetween.

4. A stator of a submerged motor as claimed in claim 3, further comprising metal rings fitted over the inner side surface of the inner cylinder in positions corresponding to the reinforcing layers and maintained in intimate contact therewith.

5. A stator of a submerged motor as claimed in claim 4, wherein said metal rings are formed of metal equal to or larger than the metal for forming said end covers in the coefficient of linear expansion.

6. A stator of a submerged motor as claimed in claim 2, wherein said reinforcing layers are each formed with a screw thread on an inner peripheral surface and said end covers are each formed with a screw thread on an outer peripheral surface of a flange at its end portion on the side of the inner cylinder, and the reinforcing layers and the end covers are threadably joined to each other with an adhesive layer being interposed therebetween.

7. A stator of a submerged motor as claimed in claim 2, wherein said reinforcing layers are each formed with a screw thread at a portion of its inner peripheral surface located remote from its axial end and a diverging tapering at a portion thereof extending from the threaded portion to the axial end, and said end covers are each formed with a screw thread at a forward end portion of its outer peripheral surface and a converging tapering at a portion thereof corresponding to said diverging tapering of the corresponding reinforcing layer, and the reinforcing layers and the end covers are threadably joined to each other at their screw threads and adhesively joined to each other at their taperings.

8. A stator of a submerged motor as claimed in claim 6, wherein said reinforcing layers are each formed with a screw thread at an outer peripheral surface and said end covers are each formed with an additional flange extending along the outer peripheral surface of the respective reinforcing layer and formed with a screw thread on an inner peripheral surface thereof, and the reinforcing layers and the flanges are threadably joined to each other with an adhesive layer being interposed therebetween.

* * * * *